United States Patent [19]

Tomitaka

[11] 3,917,433
[45] Nov. 4, 1975

[54] DEVICE FOR OPENING AND CLOSING SHUTTER OF VENTILATING FAN

[75] Inventor: Tokuhiro Tomitaka, Hitachi, Japan
[73] Assignee: Hitachi, Ltd., Japan
[22] Filed: Feb. 12, 1974
[21] Appl. No.: 441,822

[30] Foreign Application Priority Data
Feb. 12, 1973  Japan.............................. 48-16620

[52] U.S. Cl................................. 415/148; 98/116
[51] Int. Cl.² ................... F04D 29/56; F04D 25/14
[58] Field of Search....................... 98/116; 415/148

[56] References Cited
UNITED STATES PATENTS
3,536,413  10/1970  Hosono et al..................... 98/116 X
3,589,267  6/1971  Hosono et al......................... 98/116

Primary Examiner—C. J. Husar
Assistant Examiner—Leonard Smith
Attorney, Agent, or Firm—Craig & Antonelli

[57] ABSTRACT

In a device for opening and closing the shutter of a ventilating fan, in which the circuit of the motor to drive the fan is opened after the shutter has been closed by the rotational force of the motor, a mechanism is provided such that the rotational force of the motor after the closure of the shutter may not act as a force urging the shutter in the direction of the closure thereof.

7 Claims, 7 Drawing Figures

DEVICE FOR OPENING AND CLOSING SHUTTER OF VENTILATING FAN

BACKGROUND OF THE INVENTION

1. Field of the Invention

The present invention relates to an improvement on a device for opening and closing the shutter of a ventilating fan by temporarily using the rotational force of the motor to drive the fan.

2. Description of the Prior Art

In a conventional device of this kind, the shutter, which is always urged in the direction of opening thereof by means of, for example, a spring, is forcibly closed by the rotational force of the motor to drive the fan. Namely, when an instruction for ceasing the operation of the ventilating fan is received, the rotational force of the motor is transmitted as a power to close the shutter and when the shutter has been closed, the circuit of the motor is interrupted and simultaneously the state of the shutter being closed is held. Then, when an instruction of starting the operation of the fan is received, the circuit of the motor is made to rotate the motor and simultaneously the state of the shutter being closed is released, or alternatively, after the instruction of starting the operation of the ventilating fan, the shutter is first opened and then the circuit of the motor is made in response to the opening of the shutter.

With this conventional mechanism of the shutter, the rotational force of the motor due to overshoot or inertial rotational of the motor after the cessation of the operation of the ventilating fan acts forcibly on the shutter which is in the closed state. This is a drawback. Namely, the instruction of ceasing the operation of the ventilating fan causes the shutter to be closed against the force of the spring, due to the rotational force of the motor to drive the fan and the circuit of the motor is interrupted at the instant that the shutter has been closed so that the motor still continues its inertial rotation after the closure of the shutter. The inertial rotation serves as a force to urge the shutter in the direction of closing although it is in the closed state and a fault may be caused such that the device for driving the shutter open and closed may be broken.

SUMMARY OF THE INVENTION

One object of the present invention, which has been made to overcome such a drawback as mentioned above, is to protect the device for opening and closing the shutter of a ventilating fan, from a harmful force exerted on the shutter in the closed state due to inertial rotation of the motor.

Another object of the present invention is to reduce noise sounds generated during the inertial rotation of the motor in the device which can attain the first object of the present invention.

According to the present invention, therefore, there is provided a device for opening and closing the shutter of a ventilating fan, in which the circuit of the motor to drive the fan is opened after the shutter has been closed by the rotational force of the motor, wherein the force due to the overshoot or inertial rotation of the motor is prevented from acting on the shutter in the closed state.

DESCRIPTION OF THE PREFERRED EMBODIMENTS

The present invention will be described with the aid of the attached drawings.

Figure 1:
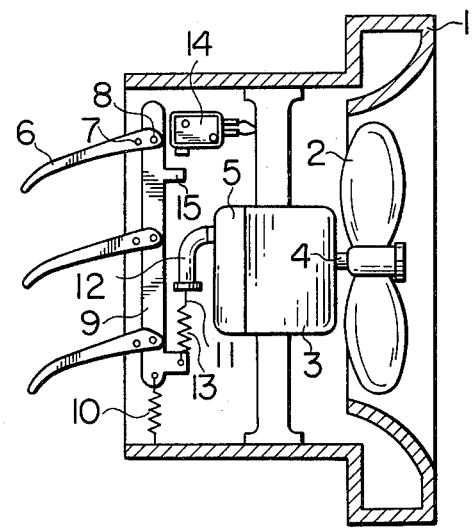
FIG. 1 shows a ventilating fan as a whole, according to the present invention.

In FIG. 1, a housing frame 1 contains therein all the parts of a ventilating fan, such as a fan 2, a motor 3 etc. The fan 2 is fixedly supported on the rotary shaft 4 of the motor 3. In a casing 5 is provided a shutter drive mechanism described later. Shutter blades 6 are rotatably supported on the frame 1 by means of pins 7 and constitute a shutter. All the shutter blades 6 are connected by pins 8 with a rod 9 and the shutter is opened by shifting the rod 9 downward. A spring 10 is provided between the lower end of the rod 9 and the frame 1, always urging the rod 9 downward. Therefore, the shutter is normally open. A protective spring 13 is anchored to the projection provided near the lower end of the rod 9 and connected with a wire 11 which is sent through a wire guide tube 12 to a wire winder described later. When the wire 11 is wound up by the winder, the shutter is closed against the force of the spring 10. A switch 14 for making and breaking the circuit to energize the motor will be described in detail in connection with the circuit of the ventilating fan in FIG. 6. A projection 15 provided near the top of the rod 9 serves to depress the actuating button of the switch 14 disposed oppositely in the vicinity thereof. When the rod 9 is shifted upward, that is, the shutter is closed, the projection 15 pushes the button of the switch 14 so that the switch 14 is opened.

Figure 2:
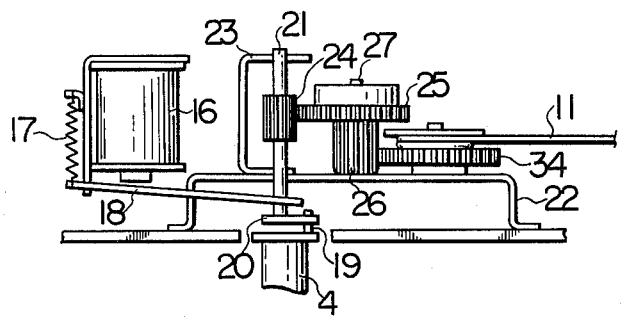
FIGS. 2 and 3 show a mechanism for opening and closing the shutter of a ventilating fan as shown in FIG. 1, the clutch being closed in FIG. 2 and open in FIG. 3.
Figure 3:
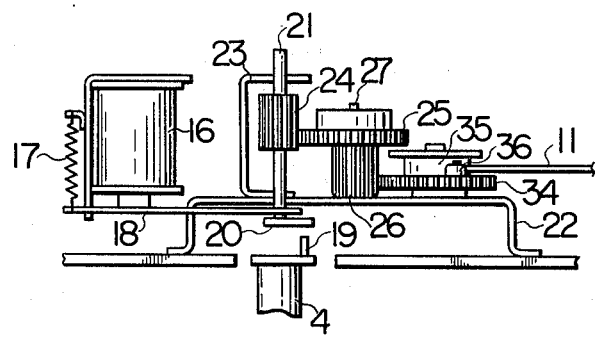
Figure 4:
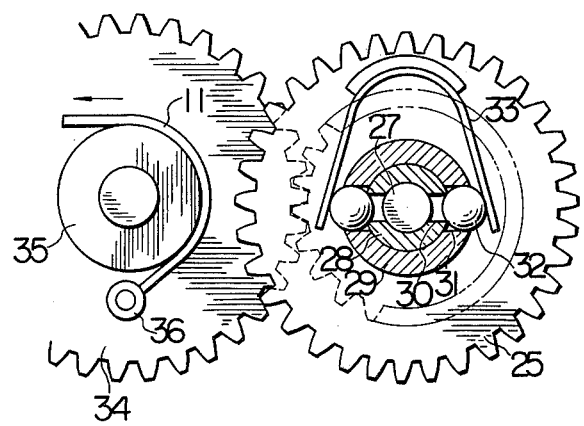
FIGS. 4 and 5 show a protective transmission means, FIG. 4 being a plan view and FIG. 5 a cross sectional view.
Figure 5:
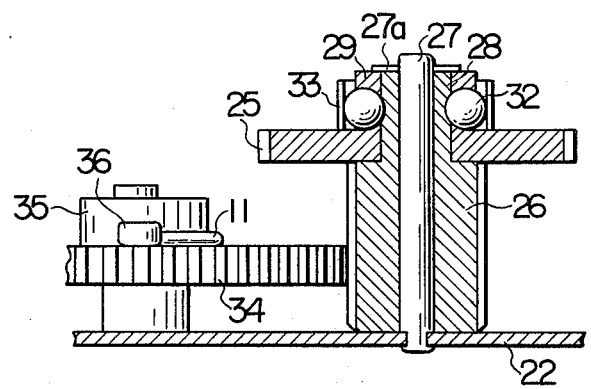

The shutter drive mechanism and the protective transmission means will now be described with the aid of FIGS. 2 to 5. In FIGS. 2 and 3, reference numerals 16, 17 and 18 indicate an electromagnet, a spring and a lever, respectively. The lever 18 is swingably supported on the frame of the electromagnet 16 and the spring 17 urges the lever 18 in such a direction as to recede from the electromagnet 16. When the electromagnet 16 is energized, the lever 18 is attracted against the force of the spring 17 to the electromagnet 16. A clutch projection 19 is provided at the end of the rotary shaft 4 of the motor 3 and a clutch bar 20 is connected with a clutch shaft 21. The clutch shaft 21 is rotatably supported between a mounting base 22 and a mounting plate 23. The clutch shaft 21 is concentrically disposed with respect to the rotary shaft 4 and can be slid up and down. When the clutch shaft 21 is in its lower position, that is, slid down, the clutch bar 20 is engaged with the clutch projection 19. Therefore, it is considered that the clutch bar 20 and the clutch projection 19 constitute a clutch mechanism. The clutch shaft 21 is also supported on the free end of the lever 18 in such a manner that the clutch shaft 21 is rotatable but not slidable in the upward and the downward direction. Accordingly, when the electromagnet 16 is energized, the clutch shaft 21 is lifted up to open the clutch. When the electromagnet 16 is de-energized, the clutch is closed due to the force of the spring 17. A cogged wheel 24 is provided on the clutch shaft 21 and engaged with a large-diameter cogged wheel 25. A cogged wheel 26 is rotatably supported on a shaft 27 fixed to the mounting base 22 and the large-diameter cogged wheel 25 is rotatably supported on a small-diameter cylindrical portion 28 formed on the upper surface of the cogged wheel 26 as shown in FIGS. 4 and 5. A cylindrical member 29 formed on the cogged wheel 25 is fitted on the cylindrical portion 28. Holes 30 are cut diametrically opposite in the cylindrical portion 28. Holes 31 are cut diametrically opposite in the cylindrical member 29. The diameters of the holes 31 are larger than those of the holes 30 and the holes 30 and 31 are in exact registration with each other. Balls 32 having a diameter slightly smaller than that of the hole 31 are fitted in the holes 31. A portion of each ball 32 is received in the hole 30. A U-shaped stripe spring 33 is provided to keep the balls 32 in the holes 31. A washer 27a is seated at the end of the shaft 27 so as to prevent the members supported on the shaft 27 from slipping off the shaft 27.

The cogged wheels 25 and 26 are mechanically coupled to each other by means of the balls 32 fitted in the holes 31 and urged by the spring 33. Since the coupling depends mainly on the urging force of the spring 33, the coupling collapses when an abnormal force greater than a predetermined value is transmitted between the cogged wheels 25 and 26. This mechanism of coupling may be called a protective transmission means and used as such.

A drum wheel 34 having cogs along its periphery is rotatably supported on a shaft and engaged with the cogged wheel 26. The cogged drum wheel 34 is provided with a wire winder 35 which serves to take up the wire 11 anchored to a wire stop 36 provided on the wheel 34. This part of the mechanism may be called a wire wind-up means and used as such.

The rotation of the motor 3 is transmitted through the cogged wheels 24, 25 and 26 to the cogged drum wheel 34 in descending ratios and this part of the mechanism may be called a decelerating means and used as such.

By virtue of this decelerating means, the wheel 34 can be rotated even if the torque of the motor 3 is small and, on the other hand, a strong torque is needed to drive the cogged wheel 24 by rotating the cogged drum wheel 34. Especially, a very strong torque must be applied to the drum wheel 34 so as to rotate the motor 3 when the clutch is closed and the cogged wheel 24 is coupled through the clutch to the rotor of the motor. This mechanism also serves to prevent the shutter from being opened by the spring 10 after the shutter has been closed. The mechanism may be called a means for maintaining the state of the shutter being closed.

Now, the circuit of the ventilating fan as a whole will be described with the aid of FIG. 6. The motor circuit consists of a main coil 37, an auxiliary coil 38 and a capacitor 39. A gang switch 40 consisting of a switch 40-1 for the motor 3 and a switch 40-2 for the electromagnet 16, serves to operate the ventilating fan. The switch 40-1 has stationary contacts a, b and c while the switch 40-2 is provided with stationary contacts a', b' and c'. The movable contacts of the switches 40-1 and 40-2 are commonly connected with one end of a power source 41 and the other end of the source 41 is connected with one end of the motor 3 and one end of the electromagnet 16. As regards the switch 40-1, the contact a is connected with the forward-rotation terminal of the motor 3 through a switch 14, the contact b is connected directly with the same forward-rotation terminal and the contact c is connected with the reverse-rotation terminal of the motor 3. As for the switch 40-2, the contact a' is floating and the contacts b' and c' are commonly connected with the other end of the electromagnet 16.

Next, the operation of the ventilating fan will be described through reference to FIGS. 1 to 6.

1. PERFORMANCE TO HALT

It is assumed that the movable contacts of the switches 40-1 and 40-2 of the gang switch 40 are resting on the stationary contacts b and b' and that the motor 3 is rotating in the forward direction to operate the ventilating fan. Under this condition, if the switches 40-1 and 40-2 are changed over to select the contacts a and a', the electromagnet 16 is deenergized to lose the force of attraction. Accordingly, the clutch shaft 21 is shifted down as shown in FIG. 2 by the force of the spring 17 to close the clutch so that the rotation of the rotary shaft 4 of the motor 3 is transmitted through the clutch, the clutch shaft 21, cogged wheels 24, 25 and 26, and the cogged drum wheel 34. The wire 11 is wound on the wire winder 35 as the drum wheel 34 rotates, so that the shutter is closed against the force of the spring 10. As soon as the shutter has been closed, the button of the switch 14 is depressed by the projection 15 of the shutter rod 9 so that the switch 14 is opened to break the motor circuit. However, the motor 3 overshoots, that is, performs a transient rotation before stopping due to the inertia of the rotor. This transient rotation tends to apply to the shutter in the closed state an additional force to further urge the shutter in the direction of closure. But, this additional force will not act as an abnormal one on the shutter by virtue of the protective spring 13 and the protective transmission means. Namely, when too great a force is applied to the winder 35, the balls 32 which are partially received in the holes 30, urged by the spring 33, come out of the holes 30 against the force of the spring 33. Consequently, the coupling between the cogged wheels 25 and 26 is released so that only the cogged wheel 25 rotates in sliding contact with the cogged wheel 26 and the effect of the transient rotation is cancelled. The force of the spring 33 urging the balls 32 into the holes 30 and 31 is such that the balls 32 may not come out of the holes 30 in the normal condition where the shutter is closed against the force of the spring 10.

In this way, the shutter in the opened state can be closed. The shutter in the closed state will be maintained in the same state against the force of the spring 10 urging the shutter in the opening direction, by virtue of the means for maintaining the state of the shutter being closed. The retension of the closed state is due to the fact that the sum of the frictional forces at the bearings of the decelerating means and of the motor 3 is greater than the force of the spring 10 to rotate the winder 35.

2. FROM REST TO OPERATION

Figure 6:
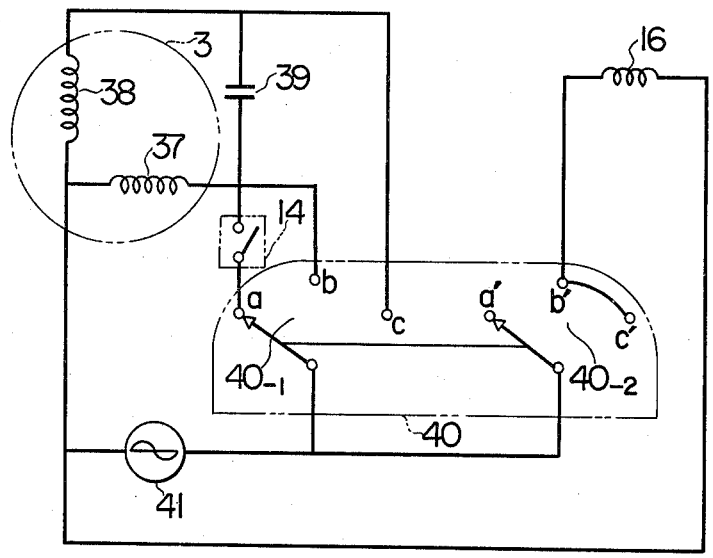
FIG. 6 is a wiring diagram of the ventilating fan shown in FIG. 1.

It is now assumed that the motor 3 is resting with the circuit as shown in FIG. 6. If the switches 40-1 and 40-2 of the gang switch 40 are changed over to select the contacts b and b', the motor 3 rotates in the forward direction. Simultaneously, the electromagnet 16 is energized so that the lever 18 is lifted up due to the attracting force of the electromagnet 16, as shown in FIG. 3, to open the clutch. Upon the opening of the clutch, the decelerating means is detached from the motor 3 and the retaining force to keep the shutter in the closed state decreases, so that the shutter is automatically opened due to the force of the spring 10. Namely, due to the force of the spring 10, the wire 11 is rewound from the winder 35, the shutter is opened, and the switch 14 is closed, so that the circuit is prepared to the next stop operation.

Thus, the starting and stopping of the ventilating fan can be performed by changing over the gang switch 40.

The selection of the contacts c and c' of the switches 40-1 and 40-2 of the gang switch 40 leads to the reverse rotation of the motor 3. In this case, nothing is different in operation except the direction of rotation of the motor 3.

Figure 7:
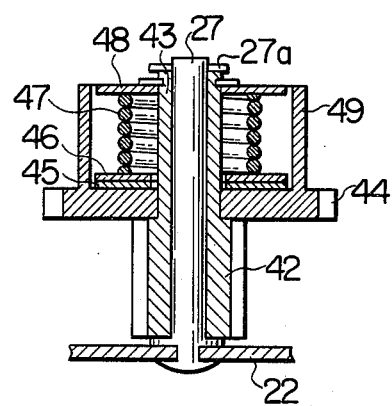
FIG. 7 shows another embodiment of the protective transmission means.

Now, an embodiment of the protective transmission means will be described through reference to FIG. 7. In FIG. 7, a cogged wheel 42 is rotatably supported on a shaft 27 (the wheel 42 corresponds to the wheel 26 described above). A small-diameter cylindrical portion 43 is formed on the cogged wheel 42 and a large-diameter cogged wheel 44 (corresponding to the cogged wheel 25 described above) having a cylindrical wall 49 integrally formed thereon is rotatably supported on the cylindrical portion 44. A lower friction disc 45 having a center perforation is fixed to the upper surface of the cogged wheel 44 and an upper friction disc 46 having the same center perforation is registered upon the lower friction disc 45. A helical spring 47 has its one end resting on and fixed to the upper friction disc 46 and the other end of the helical spring 47 is resting on and fixed to a stop disc 48 which is rigidly fixed to the cylindrical portion 43. The helical spring 47, the upper and lower friction disc 46 and 47 are housed in a doughnut-like chamber defined by the cogged wheel 44, the stop disc 48 and the cylindrical portion 43 and the cylindrical wall 49 formed on the wheel 44.

With this structure, the coupling of the cogged wheels 42 and 44 is maintained only through the friction force between the upper and lower friction disc 46 and 45. The coupling is so set as to be maintained for the normal force to close the shutter against the force of the spring 10 but to collapse under a force greater than the normal force. Namely, when too great a force is exerted on the coupling part, the contacting surfaces of the upper and lower friction disc 46 and 45 slip.

Therefore, the action of the transient rotation after the closure of the shutter can be effectively cancelled by this coupling mechanism so that the shutter can be prevented from being exposed to an abnormal force which may result in a fault.

As compared with the protective transmission means shown in FIGS. 4 and 5, this embodiment shown in FIG. 7 has an advantage that the sound produced during the operation of the means are very weak.

Namely, with the protective transmission means shown in FIGS. 4 and 5, in which the balls 32 are urged into the holes 30 and 31 by the spring 33, the balls 32 repeatedly fall into and get out of the holes 30 during the transient rotation so that the balls 32 make clicking sounds. On the other hand, with the protective transmission means shown in FIG. 7, in which the coupling is maintained only through friction force, such noisy clicking sounds are not produced.

I claim:

1. In a device for opening and closing the shutter of a ventilating fan, the improvement comprising
    a shutter mechanism including shutter blades having respective opening and closing positions,
    first means for applying a force to said shutter mechanism to urge said shutter blades to the opening position,
    motor means for rotating said ventilating fan,
    second means coupled to said motor means for selectively moving said shutter blades into said opening and closing positions, said second means utilizing the rotational force of said motor means to overcome said force of said first means such that said shutter blades are moved into said closing position, and said second means releasing the effect of said rotational force such that said shutter blades are moved into said opening position, and
    third means coupled to said second means for preventing said rotational force from exceeding the closure force for maintaining said shutter blades in the closing position after said closing position has been achieved.

2. A device for opening and closing the shutter of a ventilating fan, as claimed in claim 1, wherein said first means includes a spring member coupled to said shutter mechanism to urge said shutter blades to said opening position.

3. A device for opening and closing the shutter of a ventilating fan, as claimed in claim 1, wherein said second means includes a transmission mechanism selectively coupled to said motor means for transmitting the effect of said rotational force to said shutter mechanism, said second means further including fourth means for disconnecting said transmission mechanism from said motor means.

4. A device for opening and closing the shutter of a ventilating fan, as claimed in claim 3, wherein said third means includes a sliding coupling mechanism in said transmission mechanism to release said rotational force from acting after said closing position has been achieved.

5. A device for opening and closing the shutter of a ventilating fan, as claimed in claim 4, wherein said transmission mechanism includes two cog wheels mounted for rotation together, and said sliding coupling mechanism includes a plurality of balls releasably mounted in connection with said two cog wheels to enable only one of said two cog wheels to rotate when said closing position has been obtained.

6. A device for opening and closing the shutter of a ventilating fan, as claimed in claim 3, wherein said second means further includes a switch means for selectively coupling said transmission means to said motor means, and for selectively coupling said fourth means to said motor means, said fourth means including an electromagnetic clutch mechanism for disconnecting said transmission mechanism from said motor means.

7. A device for opening and closing the shutter of a ventilating fan, as claimed in claim 4, wherein said transmission mechanism includes two cog wheels mounted for rotation together, and said sliding coupling mechanism includes a pair of friction discs, each of said pair of friction discs being mounted in connection with a respective one of said two cog wheels for coupling said two cog wheels, and said pair of friction discs being mounted for sliding contact with respect to one another when said closing position has been obtained.

* * * * *